United States Patent
Nakashima et al.

(10) Patent No.: US 12,110,399 B2
(45) Date of Patent: Oct. 8, 2024

(54) PHOTOCURABLE INKJET PRINTING INK COMPOSITION

(71) Applicant: SAKATA INX CORPORATION, Osaka (JP)

(72) Inventors: Okinori Nakashima, Osaka (JP); Takuya Myose, Osaka (JP); Kazuhiro Fuke, Osaka (JP); Ryoichi Nitta, Osaka (JP)

(73) Assignee: SAKATA INX CORPORATION, Osaka (JP)

( * ) Notice: Subject to any disclaimer, the term of this patent is extended or adjusted under 35 U.S.C. 154(b) by 1045 days.

(21) Appl. No.: 17/042,051

(22) PCT Filed: Mar. 19, 2019

(86) PCT No.: PCT/JP2019/011386
§ 371 (c)(1),
(2) Date: Sep. 25, 2020

(87) PCT Pub. No.: WO2019/188569
PCT Pub. Date: Oct. 3, 2019

(65) Prior Publication Data
US 2021/0024762 A1  Jan. 28, 2021

(30) Foreign Application Priority Data

Mar. 29, 2018  (JP) .................................. 2018-064141

(51) Int. Cl.
| | |
|---|---|
| C09D 11/101 | (2014.01) |
| C08F 2/50 | (2006.01) |
| C08F 226/06 | (2006.01) |
| C08F 236/20 | (2006.01) |
| C08F 236/22 | (2006.01) |
| C09D 11/106 | (2014.01) |
| C09D 11/322 | (2014.01) |
| C09D 11/38 | (2014.01) |

(52) U.S. Cl.
CPC .............. *C09D 11/101* (2013.01); *C08F 2/50* (2013.01); *C08F 226/06* (2013.01); *C08F 236/20* (2013.01); *C08F 236/22* (2013.01); *C09D 11/106* (2013.01); *C09D 11/322* (2013.01); *C09D 11/38* (2013.01)

(58) Field of Classification Search
CPC ... C09D 11/101; C09D 11/106; C09D 11/322; C09D 11/38; C09D 11/30; C08F 2/50; C08F 226/06; C08F 236/20; C08F 236/22
See application file for complete search history.

(56) References Cited

U.S. PATENT DOCUMENTS

| | | | | |
|---|---|---|---|---|
| 4,172,064 A | * | 10/1979 | Keeler ................. | C09D 11/107 524/831 |
| 2006/0155002 A1 | * | 7/2006 | Odell ................... | C09D 11/101 522/178 |
| 2009/0124720 A1 | * | 5/2009 | Tsuchiya .............. | C09D 11/322 522/182 |
| 2009/0171007 A1 | | 7/2009 | Jonai et al. | |
| 2014/0333704 A1 | | 11/2014 | Takabayashi et al. | |
| 2018/0037758 A1 | * | 2/2018 | Ishikawa ............... | B29C 64/209 |
| 2018/0081197 A1 | * | 3/2018 | Qiu ......................... | G02B 1/14 |
| 2018/0215933 A1 | * | 8/2018 | Xu ........................ | C09D 11/101 |
| 2019/0211219 A1 | | 7/2019 | Kondo et al. | |
| 2023/0167312 A1 | * | 6/2023 | Nakashima .......... | C09D 11/322 522/64 |

FOREIGN PATENT DOCUMENTS

| | | | |
|---|---|---|---|
| JP | 2009120834 A | | 6/2009 |
| JP | 2011057870 A | | 3/2011 |
| JP | 2013091788 A | | 5/2013 |
| JP | 2014040585 A | * | 3/2014 |
| JP | 2015063666 A | | 4/2015 |
| JP | 2015081284 A | | 4/2015 |
| JP | 2017179093 A | | 10/2017 |

(Continued)

OTHER PUBLICATIONS

English machine translation of JP-2014040585-A (Year: 2014).*
English machine translation of WO-2015056614-A1 (Year: 2015).*
A First Office Action issued by the State Intellectual Property Office of China on Feb. 22, 2022, for Chinese counterpart application No. 201980021762.0 (6 pages).
Acrylic Resin Preservative Coatings and Their Applications, First Edition, Zhang Peng et al, p. 49, in. Chemical Industry Shu Bureau, Sep. 30, 2003 (3 pages), with a concise explanation (1 page).
Electron beam cured coatings and their applications, first edition, Zeng Xiao Jiu, et al. p. 129-130, Tianjin University, Bureau of Chinese Characters, Dec. 30, 2002 (4 pages), with a concise explanation (1 page).

(Continued)

*Primary Examiner* — Jennifer A Smith
*Assistant Examiner* — Jeffrey Eugene Barzach
(74) *Attorney, Agent, or Firm* — Law Office of Katsuhiro Arai

(57) ABSTRACT

An object is to obtain a photocurable inkjet printing ink composition that demonstrates excellent preservation stability and discharge property, while also presenting curability under ultraviolet light from a light-emitting diode (LED) light source, as well as good adhesion, flexibility and tackiness. As a solution, a photocurable inkjet printing ink composition containing photopolymerizable compounds and photopolymerization initiator is provided, wherein the photocurable inkjet printing ink composition satisfies A to D: A. 2-(allyloxy methyl) methyl acrylate is contained by 5 to 40 percent by mass in all photopolymerizable compounds; B. multifunctional monomers and/or multifunctional oligomers of 0° C. or lower in glass transition temperature are contained by 5 to 20 percent by mass in all photopolymerizable compounds; C. amino group and/or amide group-containing monomers and/or oligomers are contained; and D. the ink composition has a viscosity of 30 mPa·s or lower at 25° C.

6 Claims, No Drawings

(56) References Cited

FOREIGN PATENT DOCUMENTS

| WO | 2007013368 A1 | 2/2007 | | |
|---|---|---|---|---|
| WO | 2013084511 A1 | 6/2013 | | |
| WO | WO-2015056614 A1 * | 4/2015 | ........... | B29C 64/112 |
| WO | 2016143559 A1 | 9/2016 | | |
| WO | 2018051732 A1 | 3/2018 | | |

OTHER PUBLICATIONS

Notification Concerning Transmittal of International Preliminary Report on Patentability (PCT/IB/326) and Notification of Transmittal of Translation of the International Preliminary Report on Patentability (PCT/IB/338) mailed Oct. 8, 2020, with International Preliminary Report on Patentability (PCT/IB/373) and Written Opinion of the International Searching Authority (PCT/ISA/237), for corresponding international application PCT/JP2019/011386 (24 pages).

International Search Report (ISR) mailed May 7, 2019, issued for International application No. PCT/JP2019/011386. (2 pages).

* cited by examiner

PHOTOCURABLE INKJET PRINTING INK COMPOSITION

CROSS-REFERENCE TO RELATED APPLICATIONS

This application is the U.S. National Phase under 35 U.S.C. § 371 of International Application PCT/JP2019/011386, filed Mar. 19, 2019, which claims priority to Japanese Patent Application No. JP2018-064141, filed Mar. 29, 2018. The International Application was published under PCT Article 21(2) in a language other than English.

BACKGROUND ART

The present invention relates to a photocurable inkjet printing ink composition. To be more specific, it relates to a photocurable inkjet printing ink composition that demonstrates excellent preservation stability and discharge property of the photocurable inkjet printing ink composition itself, while also manifesting curability under ultraviolet light from a light-emitting diode (LED) light source, as well as good adhesion, flexibility, and tackiness.

Having such excellent performance characteristics as drying quickly, containing no volatile solvent and thus not causing volatilization of any environmentally harmful component, and being printable on various base materials, photocurable inks are utilized in wide-ranging fields from offset printing, gravure printing, screen printing, and letterpress printing to various types of coating applications and inkjet printing, to name a few.

In particular, photocurable inkjet printing, which provides a simple, inexpensive way of creating images regardless of the material or shape of the base material, is used in various printing fields such as logo printing, graphic printing, and photographic/image printing.

Recent years have seen the development of low-viscosity nozzle heads for use as nozzle heads capable of discharging photocurable inkjet printing ink compositions.

When a low-viscosity nozzle head is used, however, it becomes difficult to simultaneously achieve adaptability to the nozzle head and desired physical properties of the coating film.

One possible solution to simultaneously achieving adaptability to the nozzle head and desired physical properties of the coating film is to use oligomers of low glass transition temperatures; however, many such oligomers are highly viscous, which poses a challenge in the simultaneous achievement of adaptability to the nozzle head and desired physical properties of the coating film.

Another possible method is to use highly dilutable low-viscosity monomers to achieve lower viscosity; however, many such monomers are highly volatile low-molecular-weight compounds that are odorous and present a problem in that tackiness and other physical properties of the coating film will drop (refer to Patent Literature 1, for example). Yet another method for solving the tackiness issue is to use multifunctional monomers of high glass transition temperatures in large quantity; however, doing so leads to higher viscosity and lower discharge property, as well as lower flexibility and adhesion.

BACKGROUND ART LITERATURE

Patent Literature

Patent Literature 1: International Patent Laid-open No. 2007/013368

SUMMARY OF THE INVENTION

Problems to be Solved by the Invention

Accordingly, an object of the present invention is to obtain a photocurable inkjet printing ink composition for use with a low-viscosity nozzle head, wherein such photocurable inkjet printing ink composition demonstrates excellent preservation stability and discharge property, while also presenting curability under ultraviolet light from a light-emitting diode (LED) light source, as well as good adhesion, flexibility, and tackiness, because it uses 2-(allyloxy methyl) methyl acrylate, combines multifunctional monomers and/or multifunctional oligomers of 0° C. or lower in glass transition temperature with amino group and/or amide group-containing monomers and/or oligomers, and is adjusted to a viscosity of 30 mPa·s or lower at 25° C.

Means for Solving the Problems

The inventors of the present invention studied in earnest to achieve the aforementioned object, and consequently invented the photocurable inkjet printing ink composition described below.

1. A photocurable inkjet printing ink composition containing photopolymerizable compounds and a photopolymerization initiator, wherein such photocurable inkjet printing ink composition satisfies A to D:
   A. 2-(allyloxy methyl) methyl acrylate is contained by 5 to 40 percent by mass in all photopolymerizable compounds;
   B. multifunctional monomers and/or multifunctional oligomers of 0° C. or lower in glass transition temperature are contained by 5 to 20 percent by mass in all photopolymerizable compounds;
   C. amino group and/or amide group-containing monomers and/or oligomers are contained; and
   D. the ink composition has a viscosity of 30 mPa·s or lower at 25° C.
2. The photocurable inkjet printing ink composition according to 1, which contains amino group and/or amide group-containing monomers and/or oligomers by 5 to 45 percent by mass in all photopolymerizable compounds.
3. The photocurable inkjet printing ink composition according to 1 or 2, which is characterized by containing an acrylated amine compound having two photopolymerizable functional groups and two amino groups in its molecule, as well as acryloyl morpholine and/or N-vinyl caprolactam, as amino group and/or amide group-containing monomers and/or oligomers.
4. The photocurable inkjet printing ink composition according to any one of 1 to 3, which contains multifunctional monomers and/or multifunctional oligomers of 40° C. or higher in glass transition temperature by 10 percent by mass or lower in all photopolymerizable compounds.
5. The photocurable inkjet printing ink composition according to any one of 1 to 4, which contains a colorant.

Effects of the Invention

According to the photocurable inkjet printing ink composition proposed by the present invention, significant effects—such as excellent preservation stability and discharge property, the latter being achieved even when a low-viscosity nozzle head is used, and excellent curability under ultraviolet light from a light-emitting diode (LED) light source, as well as good adhesion to flooring materials, vinyl chlorides, polycarbonates, and other base materials, good flexibility and tackiness, and excellent solvent resistance—can be achieved because the ink composition contains specific photopolymerizable components. In addition, these effects can be improved further when the ink composition contains a specific acylphosphine oxide photopolymerization initiator by a specific quantity.

MODE FOR CARRYING OUT THE INVENTION

The photocurable inkjet printing ink composition proposed by the present invention, which contains at least photopolymerizable compounds and a photopolymerization initiator (hereinafter also referred to as "ink composition"), is explained below in detail. There are compounds that fall under two or more categories among the categories of compounds listed under A to C below. Such compounds are treated as belonging to each of these two or more categories and counted multiple times toward the contents of the respective categories.

<A. 2-(Allyloxy Methyl) Methyl Acrylate>

The use quantity of 2-(allyloxy methyl) methyl acrylate under the present invention is in a range of 5 to 40 percent by mass in all photopolymerizable compounds. A content lower than 5 percent by mass tends to decrease the tackiness, while a content higher than 40 percent by mass tends to decrease the adhesion and bending property.

<B. Multifunctional Monomers and/or Multifunctional Oligomers of 0° C. or Lower in Glass Transition Temperature>

For the B. multifunctional monomers and/or multifunctional oligomers of 0° C. or lower in glass transition temperature under the present invention, the following compounds may be adopted, for example.

Examples include polyethylene glycol (400) diacrylate, polyethylene glycol (600) diacrylate, alkoxylated hexane diol diacrylate, ethoxylated (30) bisphenol A diacrylate, alkoxylated neopentyl glycol diacrylate, ethoxylated (3) trimethylolpropane triacrylate, ethoxylated (6) trimethylolpropane triacrylate, ethoxylated (9) trimethylolpropane triacrylate, propoxylated (3) trimethylolpropane triacrylate, triethylene glycol dimethacrylate, tetraethylene glycol dimethacrylate, polyethylene glycol (600) dimethacrylate, ethoxylated (10) bisphenol A dimethacrylate, 1,12-dodecane diol dimethacrylate, urethane acrylate oligomer, polyester acrylic oligomer, etc.

The use quantity of multifunctional monomers and/or multifunctional oligomers of 0° C. or lower in glass transition temperature under the present invention is in a range of 5 to 20 percent by mass in all photopolymerizable compounds. A content lower than 5 percent by mass tends to decrease the tackiness and friction resistance, while a content higher than 20 percent by mass tends to decrease the adhesion and bending property.

<C. Amino Group and/or Amide Group-Containing Monomers and/or Oligomers>

For the amino group and/or amide group-containing monomers and/or oligomers under the present invention, the following compounds may be adopted, for example.

Examples include acrylamide, acryloyl morpholine, and various other (meth)acrylamide monomers, N-vinyl caprolactam and other N-vinyl amide monomers, such as CN371, CN373, CN386, CN501, CN550, and CN551 (manufactured by Sartomer, Inc.), and other acrylated amine compounds. For example, preferably an acrylated amine compound having two photopolymerizable functional groups and two amino groups in its molecule is combined with acryloyl morpholine and/or N-vinyl caprolactam.

The content of amino group and/or amide group-containing monomers and oligomers may be determined arbitrarily. From the viewpoint of curability, however, preferably their content is 5 to 45 percent by mass in all photopolymerizable compounds. If this content is lower than 5 percent by mass, the curability and tackiness may drop.

<D. Ink Composition Viscosity of 30 mPa·s or Lower at 25° C.>

The photocurable inkjet printing ink composition containing the photopolymerizable compounds under A to C above, as well as the photopolymerizable compounds under E below and photopolymerization initiator, photosensitizer, colorant, surface-active agent and various other additives as necessary, must have a viscosity of 30 mPa·s or lower at 25° C. If the viscosity exceeds 30 mPa·s, discharging the ink composition from the inkjet printing nozzle may become difficult.

It should be noted that the viscosity values cited under the present invention represent viscosities measured with an E-type viscometer (product name: RE100L Viscometer, manufactured by Toki Sangyo Co., Ltd.) under the conditions of 25° C. and 20 rpm.

<E. Combinable Photopolymerizable Compounds>

For the photopolymerizable compounds that can be combined with the compounds under A to C above in the photocurable inkjet printing ink composition proposed by the present invention, the monofunctional and multifunctional photopolymerizable compounds listed below may be utilized.

From the viewpoint of bending property, preferably the use quantity of multifunctional photopolymerizable compounds whose glass transition temperature is 40° C. or above, for example, is 10 percent by mass or lower in all photopolymerizable compounds.

For the aforementioned monofunctional photopolymerizable compounds, the following compounds may be adopted, for example:

Butyl (meth)acrylate, isobutyl (meth)acrylate, tertiary butyl (meth)acrylate, octyl (meth)acrylate, 2-ethyl hexyl (meth)acrylate, decyl (meth)acrylate, isomyristyl (meth)acrylate, stearyl (meth)acrylate, isostearyl (meth)acrylate, isobornyl (meth)acrylate, lauryl (meth)acrylate, cyclic trimethylolpropane formal (meth)acrylate, cyclohexyl (meth)acrylate, butyl cyclohexyl acrylate, trimethyl cyclohexyl acrylate, adamantyl (meth)acrylate, dicyclopentanyl (meth)acrylate, dicyclopentenyl (meth)acrylate and other acrylates, styrene, benzyl (meth)acrylate, 2-phenoxyethyl (meth)acrylate and ethylene oxide-modified products thereof, ethyl carbitol (meth)acrylate, tetrahydrofurfuryl (meth)acrylate, 2-methoxyethyl acrylate, polyethylene glycol (meth)acrylate, isoamyl (meth)acrylate, hydroxymethyl (meth)acrylate, hydroxyethyl (meth)acrylate, hydroxypropyl (meth)acrylate, hydroxybutyl (meth)acrylate, hydroxyphenoxypropyl (meth)acrylate, 2-ethylhexyl-diglycol (meth)acrylate, 2-acryloyloxyethyl hexahydrophthalic acid, butoxyethyl acrylate, ethoxydiethylene glycol (meth)acrylate, ethyl carbitol acrylate, methoxydiethylene glycol (meth)acrylate, methoxypolyethylene glycol (meth)acrylate, methoxypropylene glycol (meth)acrylate, (2-methyl-2-ethyl-1,3-dioxolane-4-yl) methyl (meth)acrylate, (3-ethyl oxetane-3-yl) methyl methacrylate, phenol ethylene glycol-modified acrylate, 2-hydroxypropyl (meth)acrylate, 2-hydroxy-3-phenoxypropyl (meth)acrylate, 2-acryloyloxyethyl succinic acid, 2-acryloyloxyethyl phthalic acid, 2-acryloyloxyethyl- 2-hydroxyethyl-phthalic acid, lactone-modified flexible acrylate, t-butyl cyclohexyl (meth)acrylate, etc.

For the multifunctional photopolymerizable compounds, compounds having multiple carbon-carbon unsaturated bonds in the molecule, such as the following compounds, may be adopted:

Vinyloxyethoxyethyl (meth)acrylate, ethylene glycol di(meth)acrylate, propylene glycol di(meth)acrylate, butane diol di(meth)acrylate, hexane diol di(meth)acrylate, dipropylene glycol di(meth)acrylate, triethylene glycol di(meth) acrylate, tripropylene glycol di(meth)acrylate and other (poly)alkylene glycol di(meth)acrylates, 1,9-nonane diol di(meth)acrylate, neopentyl glycol di(meth)acrylate, dimethylol-tricyclodecane di(meth)acrylate, neopentyl glycol hydroxypivalate di(meth)acrylate, polytetramethylene glycol diacrylate, trimethylolpropane tri(meth)acrylate and ethylene oxide-modified products thereof, pentaerythritol tri (meth)acrylate, pentaerythritol tetra(meth)acrylate and ethylene oxide-modified products thereof, dipentaerythritol penta(meth)acrylate and ethylene oxide-modified products thereof, dipentaerythritol hexa(meth)acrylate and ethylene oxide-modified products thereof, urethane (meth)acrylate, epoxy (meth)acrylate, polyester (meth)acrylate, pentaerythritol ethoxytetraacrylate, caprolactam-modified dipentaerythritol hexaacrylate, etc.

<Photopolymerization Initiator>

2,4,6-trimethyl benzoyl-diphenyl-phosphine oxide (product name: TPO, manufactured by Lambson Ltd.), bis(2,4,6-trimethyl benzoyl)-phenyl phosphine oxide (product name: IRGACURE819, manufactured by BASF SE), etc., may be used.

The content of photopolymerization initiator is preferably in a range of 3 to 25 percent by mass, or more preferably in a range of 5 to 15 percent by mass, relative to the total mass of photopolymerizable components.

By adjusting this content to the aforementioned range of 3 to 25 percent by mass, the discharge property, curability and preservation stability of the ink composition can be maintained in a well-balanced manner.

<Photosensitizer>

In the photocurable inkjet printing ink composition proposed by the present invention, a photosensitizer (compound) that has optical absorption properties primarily in the ultraviolet light wavelength range of 400 nm and higher and manifests a function to sensitize the curing reaction under light having the wavelengths in this range, may also be used together with the photopolymerization initiator, to promote the curability under ultraviolet light from a light-emitting diode (LED) light source.

Such photosensitizer may be an anthracene photosensitizer, thioxanthone photosensitizer, etc., and a thioxanthone photosensitizer is preferred. Any of these photosensitizers may be used alone or two or more types may be used together.

Specific examples include 9,10-dibutoxyanthracene, 9,10-diethoxyanthracene, 9,10-dipropoxyanthracene, 9,10-bis(2-ethylhexyloxy) anthracene and other anthracene photosensitizers, as well as 2,4-diethyl thioxanthone, 2-isopropyl thioxanthone, 4-isopropyl thioxanthone and other thioxanthone photosensitizers. Representative examples of commercial products include DBA and DEA (manufactured by Kawasaki Kasei Chemicals Ltd.) for anthracene photosensitizers, and DETX and ITX (manufactured by Lambson Ltd.) for thioxanthone photosensitizers, and the like.

Preferably the content of photosensitizer is in a range of 0 to 8 percent by mass relative to the total mass of photopolymerizable components. A content exceeding 8 percent by mass is not desirable because it represents an excessive addition that no longer leads to improvement in effects.

It should be noted that, if a thioxanthone photosensitizer is used as the photosensitizer, the photocurable inkjet printing ink composition tends to yellow and take on a hue that is yellower than the color based on the pigment (inherent hue), and therefore preferably the content of such thioxanthone photosensitizer is determined as deemed appropriate for each color.

To be specific, preferably white and clear ink compositions that are more easily affected by a change in color tone do not contain any thioxanthone compound as the photosensitizer. Also, preferably magenta and cyan ink compositions that present problems if a change in hue occurs use a thioxanthone compound only to the extent that doing so does not cause problems with the hue. Also, preferably black and yellow ink compositions use a thioxanthone compound as the photosensitizer because their hue is not affected by a color change and their photopolymerizability is lower compared to ink compositions of other hues.

<Colorant>

A colorant of each hue may be added to the photocurable inkjet printing ink composition proposed by the present invention, to obtain a photocurable inkjet printing ink composition of each color.

For such colorant, any pigment or dye traditionally used in standard photocurable inkjet printing ink compositions may be used without limitation; when lightfastness property is considered, however, pigments such as organic pigments and inorganic pigments are preferred.

Organic pigments include, for example, dye rake pigments as well as azo, benzimidazolone, phthalocyanine, quinacridone, anthraquinone, dioxazine, indigo, thioindigo, perylene, perinone, diketopyrrolopyrrole, isoindolinone, nitro, nitroso, anthraquinone, flavanthrone, quinophthalone, pyranthrone, indanthrone and other pigments, and the like. Inorganic pigments include carbon black, titanium oxide, red iron oxide, graphite, iron black, chrome oxide green, aluminum hydroxide, etc.

Also, specific examples of pigments for the photocurable inkjet printing ink composition proposed by the present invention are listed below by each representative hue.

First, yellow pigments for using the present invention as a yellow photocurable inkjet printing ink composition include, for example, C. I. Pigment Yellow 1, 2, 3, 12, 13, 14, 16, 17, 42, 73, 74, 75, 81, 83, 87, 93, 95, 97, 98, 108, 109, 114, 120, 128, 129, 138, 139, 150, 151, 155, 166, 180, 184, 185, 213, etc., or preferably C. I. Pigment Yellow 150, 155, 180, 213, etc.

Magenta pigments for using the present invention as a magenta photocurable inkjet printing ink composition include, for example, C. I. Pigment Red 5, 7, 12, 22, 38, 48:1, 48:2, 48:4, 49:1, 53:1, 57, 57:1, 63:1, 101, 102, 112, 122, 123, 144, 146, 149, 168, 177, 178, 179, 180, 184, 185, 190, 202, 209, 224, 242, 254, 255, 270, C. I. Pigment Violet 19, etc., or preferably C. I. Pigment Red 122, 202, C. I. Pigment Violet 19, etc.

Cyan pigments for using the present invention as a cyan photocurable inkjet printing ink composition include, for example, C. I. Pigment Blue 1, 2, 3, 15, 15:1, 15:2, 15:3, 15:4, 15:6, 16, 18, 22, 27, 29, 60, etc., or preferably C. I. Pigment Blue 15:4, etc.

Black pigments for using the present invention as a black photocurable inkjet printing ink composition include, for example, carbon black (C. I. Pigment Black 7), etc.

White pigments for using the present invention as a white photocurable inkjet printing ink composition include, for example, titanium oxide, aluminum oxide, etc., or preferably titanium oxide that has been surface-treated with alumina, silica or various other materials.

Preferably the content of pigment in the photocurable inkjet printing ink composition proposed by the present invention is 1 to 20 percent by mass relative to the total quantity of photocurable inkjet printing ink composition. If the content of pigment is lower than 1 percent by mass, the image quality of obtained printed matters tends to drop. If the content exceeds 20 percent by mass, on the other hand, the viscometric properties of the photocurable inkjet printing ink composition tend to be negatively affected.

<Pigment Dispersant>

The photocurable inkjet printing ink composition proposed by the present invention may contain a pigment dispersant as necessary.

For the pigment dispersant, which is used to improve the pigment dispersibility and the preservation stability of the ink composition proposed by the present invention, any of traditionally used pigment dispersants may be employed without limitation, but use of polymeric dispersants is preferred, for example. Such pigment dispersants include carbodiimide dispersants, polyester amine dispersants, fatty acid amine dispersants, modified polyacrylate dispersants, modified polyurethane dispersants, multi-chain polymer nonionic dispersants, polymer ion activators, etc. Any of these pigment dispersants may be used alone, or two or more types may be used in combination.

Preferably the aforementioned pigment dispersant is contained by 1 to 200 parts by mass when the total quantity of pigment used represents 100 parts by mass. If the content of pigment dispersant is lower than 1 part by mass, the pigment dispersibility and the storage stability of the ink composition proposed by the present invention may drop. In the meantime, while the pigment dispersant may be contained by more than 200 parts by mass, doing so may not produce any difference in terms of effects. A more preferred lower limit is 5 parts by mass, while a more preferred upper limit is 60 parts by mass, for the content of pigment dispersant.

<Surface Active Agent>

To improve its discharge stability, preferably the photocurable inkjet printing ink composition proposed by the present invention contains a silicone surface active agent or other surface active agent traditionally used in photocurable inkjet printing ink compositions as a surface active agent, according to the inkjet head being used.

Specific examples of silicone surface active agents include polyether-modified silicone oil, polyester-modified polydimethyl siloxane, polyester-modified methyl alkyl polysiloxane, etc. Any of the foregoing may be used alone, or two or more types may be used in combination.

Preferably the content of surface-active agent in the ink composition proposed by the present invention is 0.005 to 1.0 percent by mass. If this content is lower than 0.005 percent by mass, the surface tension of the photocurable inkjet printing ink composition proposed by the present invention will increase and its discharge stability from the inkjet head will drop. If the content exceeds 1.0 percent by mass, on the other hand, more bubbles will generate in the photocurable inkjet printing ink composition and its discharge stability will drop.

<Additives>

Various types of additives may be added to the photocurable inkjet printing ink composition proposed by the present invention, as necessary, to manifest various functionalities. To be specific, theses additives include photostabilizer, surface treatment agent, antioxidant, antiaging agent, crosslinking promoter, polymerization inhibitor, plasticizer, preservative, pH adjuster, defoaming agent, moisturizing agent, etc. Also, non-curable resins that function as a vehicle may or may not be compounded.

The method for preparing the ink composition proposed by the present invention is not limited in any way, and it may be prepared by adding together all of the aforementioned materials and mixing them using a bead mill, three-roll mill, etc.

It should be noted that the ink composition proposed by the present invention may also be prepared by mixing the pigment, pigment dispersant, and photopolymerizable components to obtain a concentrated base ink beforehand, and then adding the photopolymerizable components, photopolymerization initiator, as well as surface-active agent and other additives as necessary, to the concentrated base ink to achieve the desired chemical makeup of a photocurable inkjet printing ink composition.

Preferably the base material to be printed with the ink composition proposed by the present invention is a base material constituted by flooring material, vinyl chloride, polyethylene terephthalate, polycarbonate, etc.; however, any base materials traditionally printed with photocurable inkjet printing ink compositions (paper, plastic film, capsules, gels, metal foil, glass, fabric, etc.) can be printed with the ink composition proposed by the present invention without problems.

The method for printing and curing the ink composition proposed by the present invention may specifically be a method whereby the ink composition proposed by the present invention is discharged onto a base material from a low-viscosity inkjet head, after which the coating film of the ink composition proposed by the present invention that has landed on the base material is exposed to light and thereby cured.

For example, the discharge onto the base material (printing of images) may be implemented by supplying the ink composition proposed by the present invention to the low-viscosity-compatible printer head of the inkjet recording printer, and then discharging the ink composition from the printer head in such a way that the coating film on the base material will have a film thickness of 1 to 60 µm, for example. Also, the exposure to light and curing (curing of images) may be implemented by irradiating light onto the coating film of the ink composition proposed by the present invention that has been applied on the base material as images.

For the inkjet recording printer device with which to print the ink composition proposed by the present invention, any inkjet recording printer device equipped with a low-viscosity inkjet head may be utilized. It should be noted that, if a continuous-type inkjet recording printer device is used, a conductivity-adding agent is further added to the ink composition proposed by the present invention to adjust its conductivity.

The light source used in the aforementioned curing of the coating film may be ultraviolet light (UV), ultraviolet light (light-emitting diode (LED)), electron beam, visible light, etc., where a light-emitting diode (LED) that generates ultraviolet light with an emission peak wavelength in a range of 350 to 420 nm is preferred from the environmental aspect.

Ultraviolet light from a light-emitting diode (LED) light source refers to "light irradiated from a light-emitting diode that generates ultraviolet light with an emission peak wavelength in a range of 350 to 420 nm."

EXAMPLES

The present invention is explained in greater detail below by citing examples, but the present invention is not limited to these examples. It should be noted that, unless otherwise specified, "percent" and "part" refer to "percent by mass" and "part by mass," respectively.

<Glass Transition Temperature Tg>

Here, the glass transition temperature Tg equals the theoretical glass transition temperature obtained by Wood's equation as shown below:

Wood's equation: $1/Tg=W1/Tg1+W2/Tg2+W3/Tg3+\ldots+W_x/Tg_x$ (In the equation, Tg1 to $Tg_x$ represent the glass transition temperatures of the homopolymers of polymerizable monomers 1, 2, 3, ..., x constituting the copolymer, respectively, while W1 to $W_x$ represent the mass fractions of monomers 1, 2, 3, ..., x, respectively, and Tg represents the theoretical glass transition temperature. It should be noted that the glass transition temperature in Wood's equation is an absolute temperature.)

The materials used in the following Examples and Comparative Examples are listed below.

<A. 2-(Allyloxy Methyl) Methyl Acrylate>
<B. Multifunctional Monomers and/or Multifunctional Oligomers of 0° C. or Lower in Glass Transition Temperature>
  Ethoxylated (3) trimethylolpropane triacrylate
  Propoxylated (3) trimethylolpropane triacrylate
<C. Amino Group and/or Amide Group-containing Monomers and/or Oligomers>
  Amine-modified oligomer (oligomer of acrylated amine compound having two photopolymerizable functional groups and two amino groups in its molecule) (CN371: manufactured by Sartomer Inc.)
  Acryloyl morpholine
  N-vinyl caprolactam
<E. Combinable Photopolymerizable Compounds>
  Hexane diol diacrylate
  Butyl cyclohexyl acrylate (4-tert-butyl cyclohexyl acrylate)
  Trimethyl cyclohexyl acrylate (3,3,5-trimethyl cyclohexyl acrylate)
  Isobornyl acrylate
  Benzyl acrylate
  Ethyl carbitol acrylate
<Photopolymerization Initiators>
  TPO: 2,4,6-trimethyl benzoyl-diphenyl-phosphine oxide
  SB-PI719: Bis(2,4,6-trimethyl benzoyl)-phenyl phosphine oxide
<Photosensitizer>
  DETX: 2,4-dietyl thioxanthone
<Polymerization Inhibitors>
  UV-5: Dioctyl maleate
  UV-22: Quinone polymerization inhibitor (manufactured by Kromachem Ltd.)
<Silicone Leveling Agents>
  BYK-315N (manufactured by BYK-Chemie GmbH)
  BYK-331 (manufactured by BYK-Chemie GmbH)
<Pigment Dispersant>
  SS32000 (SOLSPERSE 32000) (manufactured by Lubrizol Japan Limited)
<Preparation of Photocurable Inkjet Printing Ink Compositions>

Mixtures, respectively produced by compounding the pigment, pigment dispersant, and photopolymerizable components at the compounding ratios (ratios by mass) in Tables 1 and 2, were dispersed using an Eiger mill (with zirconia beads of 0.5 mm in diameter used as a medium) to obtain base compositions.

The respective components were compounded into the obtained base compositions according to the compounding makeups (percent by mass) listed in Tables 1 and 2, and then mixed under agitation, to obtain the photocurable inkjet printing ink compositions in Examples and Comparative Examples.

(Viscosity Measurement of Ink Composition)

The photocurable inkjet printing ink compositions obtained in the Examples and Comparative Examples were measured for viscosity using an E-type viscometer (product name: RE100L Viscometer, manufactured by Toki Sangyo Co., Ltd.) under the conditions of 25° C. in temperature and 20 rpm in rotor speed. The results are shown in Tables 1 and 2.

(Preservation Stability)

The photocurable inkjet printing ink compositions obtained in the Examples and Comparative Examples were each taken into a glass vial which was then sealed and preserved for seven days at 70° C., after which the state of the ink composition was evaluated according to the evaluation standards below:

○: There is no thickening or sedimentation.
Δ: There is thickening and sedimentation that will disappear once the vial is shaken lightly.
x: There is thickening and sedimentation that will not disappear even after the vial is shaken strongly.

(Discharge Stability)

An inkjet printing (recording) device equipped with an inkjet nozzle for low-viscosity inks, as well as the photocurable inkjet printing ink compositions obtained in the Examples and Comparative Examples, were let stand for 24 hours in an ambient temperature of 25° C. to bring the temperatures of the inkjet printing device and ink compositions to 25° C. Thereafter, at 25° C., each ink composition was used to continuously print (print text) on PVC80 (vinyl chloride resin sheet (12 cm×18 cm), manufactured by Lintec Corporation) to evaluate the discharge stability according to the standards below:

○: Printing is not disturbed, and the ink composition can be discharged in a stable manner.
x: Printing is disturbed, or the ink composition cannot be discharged in a stable manner.

(Curability)

An inkjet printing (recording) device equipped with an inkjet nozzle for low-viscosity inks, as well as the photocurable inkjet printing ink compositions obtained in the Examples and Comparative Examples, were let stand for 24 hours in an ambient temperature of 25° C. to bring the temperatures of the inkjet printing device and ink compositions to 25° C. Thereafter, at 25° C., each ink composition was used to continuously print (print text) on PVC80 (vinyl chloride resin sheet (12 cm×18 cm), manufactured by Lintec Corporation), after which the ink composition was cured with an UV-LED lamp manufactured by Phoseon Technology, Inc., to a cumulative UV light quantity of 180 m², with the distance between the lamp and the ink application surface kept to 2 cm. Each cured coating film was then rubbed with a cotton swab to evaluate the curability based on the degree of removal of the coating film as follows:

○: Not removed.
Δ: Slightly removed.
x: Removed.

(Tackiness)

Each cured coating film as described above was touched with a finger and the subsequent state of the coating film surface was visually checked, to evaluate the tackiness as follows:
○: No fingerprints are left on the coating film.
Δ: Fingerprints are slightly left on the coating film.
x: Fingerprints are left on the coating film.

(Adhesion)

Each cured film obtained in the curability evaluation was cross-cut with a cutting knife, after which a cellophane tape (product name: CELLOTAPE (registered trademark), manufactured by Nichiban Co., Ltd.) was stuck to the cut area and then peeled away, to evaluate the degree of peeling of the cured film from the vinyl chloride resin sheet according to the standards below:
○: The cured film does not peel.
Δ: The cured film peels, but the peeled area is smaller than 20%.
x: The peeled area of the cured film is 20% or larger.

(Bending Property)

Each cured film obtained in the curability evaluation was bent by 180 degrees in a mountain fold direction, and also in a valley fold direction, to evaluate the bending property of the printed ink according to the evaluation standards below:
○: No line cracks or fine cracks generate in the coating film when bent.
Δ: Fine cracks generate in the coating film when bent.
x: Line cracks generate in the coating film when bent.

(Solvent Resistance)

Each cured film obtained in the curability evaluation was rubbed 20 times on its surface with a bleached cloth moistened with isopropyl alcohol, by applying a load of 500 g to the cloth, using a Gakushin-type rubbing tester (manufactured by Daiei Kagaku Seiki MFG. Co., Ltd.), after which the state of soiling of the bleached cloth and state of the rubbed surface of the cured film were visually observed to determine the degree of dissolution of the cured film and evaluate the solvent resistance according to the standards below:
○: Neither the bleached cloth is soiled nor the cured film is worn.
Δ: The bleached cloth is soiled, but no wear is observed on the cured film.
x: The bleached cloth is soiled and the cured film is also worn.

TABLE 1

| | | Examples | | | | | | | |
|---|---|---|---|---|---|---|---|---|---|
| | | 1 | 2 | 3 | 4 | 5 | 6 | 7 | 8 |
| 2-(allyloxy methyl) methyl acrylate | | 15 | 15 | 15 | 15 | 8 | 25 | 15 | 15 |
| Amine-modified oligomer | | 4 | 4 | 4 | 4 | 4 | 4 | 4 | 4 |
| Acryloyl morpholine | | — | — | — | — | — | — | — | 14.5 |
| N-vinyl caprolactam | | 14.5 | 14.5 | 14.5 | 14.5 | 14.5 | 5 | 14.5 | — |
| Ethoxylated (3) trimethylolpropane triacrylate | | 10 | 10 | 10 | 10 | 10 | 10 | 10 | 10 |
| Propoxylated (3) trimethylolpropane triacrylate | | — | — | — | — | — | — | — | — |
| Hexane diol diacrylate | | — | — | — | — | 5 | — | — | — |
| Butyl cyclohexyl acrylate | | 10 | 10 | 10 | 10 | 10 | 10 | — | 10 |
| Trimethyl cyclohexyl acrylate | | — | — | — | — | — | — | 10 | — |
| Isobornyl acrylate | | 2 | 2 | 2 | 2 | 2 | 2 | 2 | 2 |
| Benzyl acrylate | | 16.15 | 10.3 | 11.24 | 13.52 | 18.15 | 15.65 | 16.15 | 16.15 |
| Ethyl carbitol acrylate | | 9.5 | 9.5 | 9.5 | 9.5 | 9.5 | 9.5 | 9.5 | 9.5 |
| TPO | | 7 | 9 | 8.5 | 7 | 7 | 7 | 7 | 7 |
| SBPI719 | | 2 | — | — | — | 2 | 2 | 2 | 2 |
| DETX | | 0.1 | 0.2 | 1 | 4 | 0.1 | 0.1 | 0.1 | 0.1 |
| UV-5 | | 2 | 2 | 2 | 3 | 2 | 2 | 2 | 2 |
| UV-22 | | 0.4 | 0.4 | 0.4 | 0.4 | 0.4 | 0.4 | 0.4 | 0.4 |
| BYK-315N | | 0.5 | 0.5 | 0.5 | 0.5 | 0.5 | 0.5 | 0.5 | 0.5 |
| BYK-331 | | 0.1 | 0.1 | 0.1 | 0.1 | 0.1 | 0.1 | 0.1 | 0.1 |
| Pigment dispersants | PB15:4 | 1.35 | — | — | — | 1.35 | 1.35 | 1.35 | 1.35 |
| | PR122 | — | 2 | — | — | — | — | — | — |
| | PY155 | — | — | 2 | — | — | — | — | — |
| | PB7 | — | — | — | 1.3 | — | — | — | — |
| | Benzyl acrylate | 4.86 | 9.7 | 7.76 | 4.66 | 4.86 | 4.86 | 4.86 | 4.86 |
| | SS32000 | 0.54 | 0.8 | 1.5 | 0.52 | 0.54 | 0.54 | 0.54 | 0.54 |
| Total | | 100 | 100 | 100 | 100 | 100 | 100 | 100 | 100 |
| Viscosity | | 11.0 | 10.8 | 10.7 | 11.0 | 12.8 | 9.5 | 11.7 | 13.5 |
| Preservation stability | | ○ | ○ | ○ | ○ | ○ | ○ | ○ | ○ |
| Discharge stability | | ○ | ○ | ○ | ○ | ○ | ○ | ○ | ○ |
| Curability | | ○ | ○ | ○ | ○ | ○ | ○ | ○ | ○ |
| Tackiness | | ○ | ○ | ○ | ○ | ○ | ○ | ○ | ○ |
| Adhesion | | ○ | ○ | ○ | ○ | ○ | ○ | ○ | ○ |
| Bending property | | ○ | ○ | ○ | ○ | ○ | ○ | ○ | ○ |
| Solvent resistance | | ○ | ○ | ○ | ○ | ○ | ○ | ○ | ○ |

TABLE 2

|  |  | Examples | | | | | Comparative Examples | | | |
|---|---|---|---|---|---|---|---|---|---|---|
|  |  | 9 | 10 | 11 | 12 | 13 | 1 | 2 | 3 | 4 |
| 2-(allyloxy methyl) methyl acrylate | | 15 | 11 | 15 | 15 | 15 | 3 | 45 | 15 | 15 |
| Amine-modified oligomer | | 4 | 4 | 4 | 4 | 4 | 4 | 4 | 4 | 4 |
| Acryloyl morpholine | | — | 34 | — | — | — | — | — | — | — |
| N-vinyl caprolactam | | 14.5 | — | 14.5 | 14.5 | — | 14.5 | 10 | 14.5 | 14.5 |
| Ethoxylated (3) trimethylolpropane triacrylate | | — | 10 | 6 | 18 | 10 | 10 | 10 | 4 | 25 |
| Propoxylated (3) trimethylolpropane triacrylate | | 10 | — | — | — | — | — | — | — | — |
| Hexane diol diacrylate | | — | — | 5 | — | — | 5 | — | 5 | — |
| Butyl cyclohexyl acrylate | | 10 | 10 | 10 | 10 | 15 | 10 | 5 | 10 | 10 |
| Trimethyl cyclohexyl acrylate | | — | — | — | — | — | — | — | — | — |
| Isobornyl acrylate | | 2 | 2 | 2 | 2 | 2 | 2 | — | 2 | 2 |
| Benzyl acrylate | | 16.15 | 0.65 | 15.15 | 8.15 | 25.65 | 23.15 | — | 17.15 | 1.15 |
| Ethyl carbitol acrylate | | 9.5 | 9.5 | 9.5 | 9.5 | 9.5 | 9.5 | 7.15 | 9.5 | 9.5 |
| TPO | | 7 | 7 | 7 | 7 | 7 | 7 | 7 | 7 | 7 |
| SBPI719 | | 2 | 2 | 2 | 2 | 2 | 2 | 2 | 2 | 2 |
| DETX | | 0.1 | 0.1 | 0.1 | 0.1 | 0.1 | 0.1 | 0.1 | 0.1 | 0.1 |
| UV-5 | | 2 | 2 | 2 | 2 | 2 | 2 | 2 | 2 | 2 |
| UV-22 | | 0.4 | 0.4 | 0.4 | 0.4 | 0.4 | 0.4 | 0.4 | 0.4 | 0.4 |
| BYK-315N | | 0.5 | 0.5 | 0.5 | 0.5 | 0.5 | 0.5 | 0.5 | 0.5 | 0.5 |
| BYK-331 | | 0.1 | 0.1 | 0.1 | 0.1 | 0.1 | 0.1 | 0.1 | 0.1 | 0.1 |
| Pigment dispersants | PB15:4 | 1.35 | 1.35 | 1.35 | 1.35 | 1.35 | 1.35 | 1.35 | 1.35 | 1.35 |
| | PR122 | — | — | — | — | — | — | — | — | — |
| | PY155 | — | — | — | — | — | — | — | — | — |
| | PB7 | — | — | — | — | — | — | — | — | — |
| | Benzyl acrylate | 4.86 | 4.86 | 4.86 | 4.86 | 4.86 | 4.86 | 4.86 | 4.86 | 4.86 |
| | SS32000 | 0.54 | 0.54 | 0.54 | 0.54 | 0.54 | 0.54 | 0.54 | 0.54 | 0.54 |
| Total | | 100 | 100 | 100 | 100 | 100 | 100 | 100 | 100 | 100 |
| Viscosity | | 10.3 | 17.3 | 10.1 | 14.2 | 7.5 | 12.1 | 6.6 | 9.4 | 13.3 |
| Preservation stability | | ○ | ○ | ○ | ○ | ○ | ○ | ○ | ○ | ○ |
| Discharge stability | | ○ | ○ | ○ | ○ | ○ | ○ | ○ | ○ | ○ |
| Curability | | ○ | ○ | ○ | ○ | Δ | ○ | ○ | ○ | ○ |
| Tackiness | | ○ | ○ | ○ | ○ | Δ | x | ○ | x | ○ |
| Adhesion | | ○ | ○ | ○ | ○ | ○ | ○ | x | ○ | x |
| Bending property | | ○ | ○ | ○ | ○ | ○ | ○ | x | ○ | x |
| Solvent resistance | | ○ | ○ | ○ | ○ | ○ | ○ | ○ | x | ○ |

According to the results of the Examples, the photocurable inkjet printing ink compositions conforming to the present invention demonstrated excellent curability, tackiness, adhesion, bending property, and solvent resistance. By contrast, Comparative Example 1 with a lower content of 2-(allyloxy methyl) methyl acrylate did not achieve good tackiness, Comparative Example 2 with a higher content of 2-(allyloxy methyl) methyl acrylate failed to achieve good adhesion and bending property, Comparative Example 3 containing less of B components exhibited poor tackiness and solvent resistance, and Comparative Example 4 containing more of B components had poor adhesion and bending property.

What is claimed is:

1. A photocurable inkjet printing ink composition containing photopolymerizable compounds and a photopolymerization initiator, the photocurable inkjet printing ink composition satisfying A to D:
    A. 2-(allyloxy methyl) methyl acrylate is contained by 5 to 40 percent by mass in all photopolymerizable compounds;
    B. multifunctional monomers and/or multifunctional oligomers of 0° C. or lower in glass transition temperature are contained by 5 to 20 percent by mass in all photopolymerizable compounds;
    C. amino group and/or amide group-containing monomers and oligomers are contained, wherein a combination of (i) an acrylated amine compound having two photopolymerizable functional groups and two amino groups in its molecule and (ii) acryloyl morpholine and/or N-vinyl caprolactam is used; and
    D. the ink composition has a viscosity of 30 mPa·s or lower at 25° C.,
    wherein the amino group and/or amide group-containing monomers and oligomers are contained by 5 to 45 percent by mass in all photopolymerizable compounds.

2. The photocurable inkjet printing ink composition according to claim 1, which contains multifunctional monomers and/or multifunctional oligomers of 40° C. or higher in glass transition temperature by 10 percent by mass or lower in all photopolymerizable compounds.

3. The photocurable inkjet printing ink composition according to claim 1, which contains a colorant.

4. The photocurable inkjet printing ink composition according to claim 2, which contains a colorant.

5. The photocurable inkjet printing ink composition according to claim 1, which contains no non-curable resin.

6. The photocurable inkjet printing ink composition according to claim 1, which contains neither multifunctional monomers nor multifunctional oligomers of 40° C. or higher in glass transition temperature.

* * * * *